US012737210B2

(12) United States Patent
Ng et al.

(10) Patent No.: US 12,737,210 B2
(45) Date of Patent: Sep. 15, 2026

(54) SECURE MANAGEMENT DEVICE CONTROL INFORMATION IN CONFIDENTIAL COMPUTING ENVIRONMENTS

(71) Applicants: ATI TECHNOLOGIES ULC, Markham (CA); ADVANCED MICRO DEVICES, INC., Santa Clara, CA (US)

(72) Inventors: Philip Ng, Toronto (CA); Nippon Raval, Markham (CA); Jeremy W. Powell, Austin, TX (US); Donald Matthews, Jr., Ft. Collins, CO (US); David Kaplan, Austin, TX (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 628 days.

(21) Appl. No.: 18/113,655

(22) Filed: Feb. 24, 2023

(65) Prior Publication Data

US 2024/0289150 A1 Aug. 29, 2024

(51) Int. Cl.
*G06F 9/455* (2018.01)
*G06F 13/42* (2006.01)

(52) U.S. Cl.
CPC ...... *G06F 9/45558* (2013.01); *G06F 13/4221* (2013.01); *G06F 2009/45579* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 2007/0283195 | A1 | 12/2007 | Reinhardt et al. | |
| 2008/0005794 | A1 | 1/2008 | Inoue et al. | |
| 2017/0048249 | A1 | 2/2017 | Berrange | |
| 2017/0277898 | A1* | 9/2017 | Powell | G06F 21/53 |
| 2018/0107608 | A1* | 4/2018 | Kaplan | G06F 12/1466 |
| 2018/0232320 | A1* | 8/2018 | Raval | G06F 12/1081 |
| 2019/0228145 | A1 | 7/2019 | Shanbhogue et al. | |
| 2020/0285500 | A1* | 9/2020 | Busaba | G06F 9/45533 |
| 2021/0109798 | A1* | 4/2021 | Kaplan | G06F 9/45558 |
| 2021/0294628 | A1* | 9/2021 | Tsirkin | G06F 9/45558 |
| 2024/0004990 | A1* | 1/2024 | Kakaiya | G06F 9/45558 |

OTHER PUBLICATIONS

International Preliminary Report on Patentability mailed Sep. 4, 2025 for PCT/US2024/010689, 7 pages.
International Search Report and Written Opinion issued in Application No. PCT/US2024/010689, mailed May 8, 2024, 10 pages.

* cited by examiner

*Primary Examiner* — Mustafa A Amin

(57) ABSTRACT

A processor includes a security processor and an input-output memory management unit (IOMMU). The security processor is configured to maintain device control information in a secure data structure and prevent a hypervisor from accessing the secure data structure. The IOMMU is configured to process at least one device request targeting a virtual machine from an input/output device based on the secure data structure.

20 Claims, 7 Drawing Sheets

| DEVICE ID | VMID | ASID | VM BINDING | OTHER |
|---|---|---|---|---|
| DEVICE ID | VMID | ASID | VM BINDING | OTHER |
| ∘∘∘ | ∘∘∘ | ∘∘∘ | ∘∘∘ | ∘∘∘ |

FIG. 2

SECURE MANAGEMENT DEVICE CONTROL INFORMATION IN CONFIDENTIAL COMPUTING ENVIRONMENTS

BACKGROUND

In a confidential computing environment, a processing system (e.g., a server) executes multiple software programs, such as virtual machines and a virtual machine manager (e.g., a hypervisor), wherein different software programs are owned by different entities. For example, in some confidential computing environments, different virtual machines executed by the environment are owned by different companies. A virtual machine manager (e.g., a hypervisor) controls the scheduling of the different virtual machines for execution and provides an interface between the virtual machines and the server hardware so that each virtual machine (VM) can operate as if that VM were executing on its own dedicated hardware.

Because different entities often own the different VMs, some confidential computing systems support security features that prevent one VM from accessing the data or other information associated with another VM. However, in some cases, the confidential information of a VM is accessible via input/output devices that interact with the VM.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

FIG. 2 is a block diagram of an example secure device table implemented by the processing system of FIG. 1 to securely manage device control information in accordance with some implementations.

DETAILED DESCRIPTION

Figure 1:
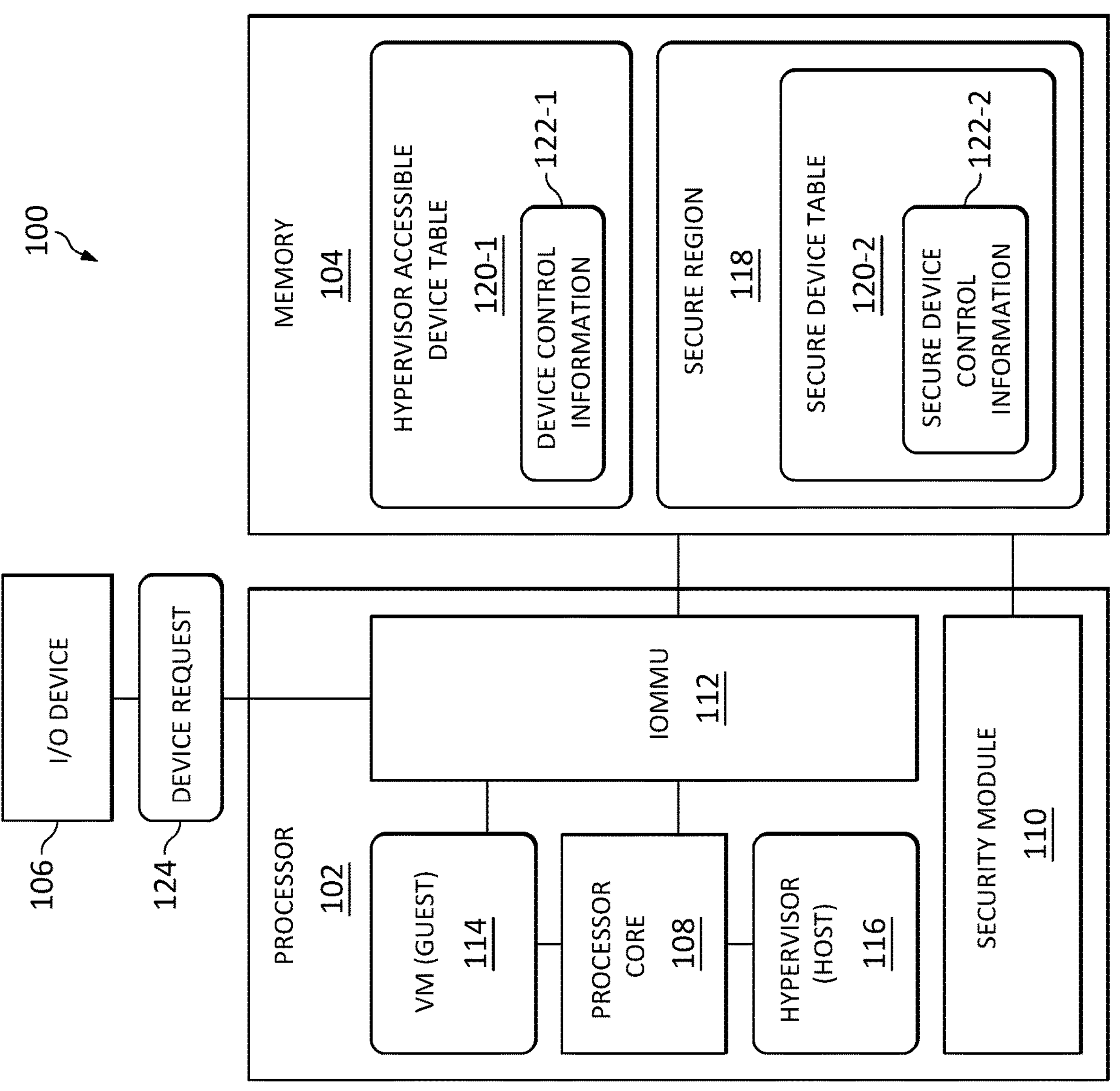
FIG. 1 is a block diagram of a processing system that implements a secure device table for securely managing device control information of an input/output (I/O) device in accordance with some implementations.

FIGS. 1-7 illustrate techniques for managing and using input/output (I/O) device control information securely in a confidential computing environment in accordance with some implementations. Device control information that affects the security or integrity of VMs, or that potentially allows a hypervisor access to confidential information of VMs, is maintained by a security module (e.g., a security processor) in a secure data structure, such as a secure device table (SDT). The security module maintains the SDT in a secure region of memory that is not accessible to the hypervisor. However, in at least some implementations, other device control information, such as host paging table information, that poses less of a security threat to the VMs is still maintained by the hypervisor. When a device/access request, such as a direct memory access (DMA) request or an address translation request, is received by an input/output memory management unit (IOMMU) from an I/O device, the IOMMU is configured to process the received access request against the SDT to, for example, determine how to handle the access request and if the access request should be allowed. The techniques described herein ensure that information for I/O devices that can affect the security and integrity of VMs is managed and maintained in a secure manner by a trusted component rather than a potentially malicious entity, such as a hypervisor. As such, the techniques described herein prevent a malicious entity from accessing confidential information of a VM via I/O device control information (also referred to herein as "device control information") and further prevents attacks on a VM via the device control information.

To illustrate further via an example, in some processing systems, VMs interact with a hypervisor to access I/O devices in a virtualized manner. The hypervisor communicates with the I/O devices via the IOMMU. However, the hypervisor itself can introduce security risks to the VMs. In particular, allowing the hypervisor to manage and access device control information can allow the hypervisor to determine VM behavior and potentially expose confidential data. For example, a malicious hypervisor can use the device control information to control the functionality of I/O devices and identify the behavior of a particular VM, such as how a VM attempts to use a particular I/O device, what devices are the target of particular VM requests, and the like. The malicious hypervisor can use this behavior to potentially identify confidential information associated with a VM. In addition, enabling or disabling particular device controls can allow attacks on a VM via an I/O device.

To prevent these and similar attacks by a malicious entity, a processing system, using the techniques described herein, employs a security module to ensure that device control information, which can affect the security of a VM and its confidential information, is securely managed and maintained in an SDT that is not accessible to the hypervisor. The security module stores the device control information in a secure portion(s) of memory that is not accessible by the hypervisor. Examples of the device control information managed and maintained by the security module include I/O device identifiers, VM identifiers, identifiers of memory assigned to a VM, device interface VM bindings, security attributes, Peripheral Component Interconnect Express (PCIe) stream identifiers such as integrity and encryption (IDE) stream identifiers (StreamIDs), PCIe root port information, PCIe feature settings, Address Translation Service (ATS) mode indicators, and the like. If a VM or hypervisor wants to make changes to device control information stored in the SDT, they send a change/modification request to the security module. The security module determines whether or not to act upon the request based on, for example, one or more security policies. In at least some implementations, if the hypervisor requests to change the device control information, the security module communicates with the VM to confirm if the VM accepts the change(s) requested by the hypervisor. If the security module determines that the change requested by the VM or hypervisor comprimises the security of a VM or confidential information, the requested changes to the device control information are not made.

In at least some implementations, the IOMMU examines the SDT when there is traffic from or to an I/O device to make a security policy decision whether the access is allowed or not allowed. As part of this security policy decision, the IOMMU determines if the I/O device is bound to the VM that the I/O device is targeting. For example, in some implementations, the security module implements a specified device binding process (e.g., a Trusted Execution Environment (TEE) Device Interface Security Protocol (TDISP) process) that binds an I/O device to a VM. The binding process implements specified processes, such as an authentication process, that allows the VM to "trust" the I/O device—that is, to assume that the operations of the I/O device are secure and unlikely to result in the exposure of confidential VM information. The security module stores device control information in the SDT associated with the binding process. For example, the security module stores an identifier associated with the I/O device (or device interface) bound to a specified VM, an identifier associated with the VM, the region of memory assigned to the specified VM, and the like.

In response to receiving a DMA or address translation request from an I/O device, (also referred to herein as a "device request"), the IOMMU accesses the SDT to determine whether the requesting I/O device is securely bound to a VM. If so, the IOMMU performs access control checks, such as reverse map table (RMT or RMP) checks appropriate for the type of device request (secure guest request or shared/non-secure guest/hypervisor request). For secure guest requests, the IOMMU checks the SDT to confirm that the memory to be accessed by the I/O device is owned by the VM to which the device is bound. If the memory is not owned by the VM or if the I/O device is not bound to the VM, the IOMMU does not execute the device request. Otherwise, the IOMMU executes the access request. Thus, based on the techniques described herein, an IOMMU uses the SDT maintained by the security module to prevent the execution of a device request when the requesting device is not bound to the VM associated with the request or when the memory to be accessed by the device is not owned/assigned to the VM. The IOMMU, security module, and the SDT thus prevent unauthorized access to or modification of confidential information associated with a VM. Further, because the SDT is not accessible to the hypervisor or directly accessible by a VM, it is difficult for a hypervisor or other entity to access and manipulate the device control information stored therein. Thus, VM security is preserved.

FIG. 1 illustrates a processing system 100 that implements secure management of device control information for I/O devices in accordance with some implementations. The processing system 100 is generally configured to execute sets of instructions (e.g., computer programs) to carry out tasks on behalf of an electronic device. Accordingly, the processing system 100 is part of various electronic devices in different implementations. For purposes of description, it is assumed that the processing system 100 is part of an electronic device that implements a confidential computing environment, such as a server. However, in other implementations, the processing system 100 is part of a desktop computer, laptop computer, tablet, game console, and the like.

To implement the confidential computing environment and to execute the sets of instructions and corresponding operations, the processing system 100 includes a processor 102, a memory 104, and one or more input/output (I/O) devices, such as I/O device 106. In some implementations, the processor 102 is a general-purpose processor, such as a central processing unit (CPU), including hardware structures configured to retrieve and execute the sets of instructions. The memory 104 includes one or more memory devices configured to store and retrieve data based on commands (e.g., store and load commands) received from the processor 102. Accordingly, in different implementations, the memory 104 is random access memory (RAM), non-volatile memory (NVM), hard disc memory, and the like, or any combination thereof.

The I/O device 106 is any device that can, independent of the processor 102, process input information, output information, or a combination thereof on behalf of the processing system 100. For example, in some implementations, the I/O device 106 is a network interface device that processes input and output information for a network (not shown) connected to the processing system 100. In other implementations, the I/O device 106 is a storage controller (e.g., a disc controller or non-volatile memory (NVM) storage controller), a controller associated with a user interface (e.g., a keyboard), and the like.

To execute the sets of instructions and corresponding operations, the processor 102 includes a processor core 108, a security module 110 (e.g., security processor, security circuitry, or the like), and an input/output memory management unit (IOMMU) 112. It will be appreciated that, in some implementations, the processor 102 includes additional hardware to execute instructions and to execute operations based on those instructions, such as additional processor cores, additional processing units (e.g., one or more graphics processing units), one or more controllers (e.g., memory controllers and input/output controllers), and the like.

The processor core 108 includes one or more instruction pipelines, including a plurality of stages to execute instructions in a pipelined fashion. Thus, for example, in some implementations, an instruction pipeline of the processor core 108 includes a fetch stage, a decode stage, a dispatch stage, one or more execution stages (with one or more corresponding execution units), a retire stage, and the like. The processor core 108 also includes, or has access to, memory structures and other hardware (not explicitly illustrated in FIG. 1) that support the execution of instructions. For example, in some implementations, the processor core 108 includes or has access to one or more cache structures to store data used to execute the instructions.

The security module 110 is a set of hardware structures generally configured to create, monitor, and maintain a secure environment for the processor 102. For example, in at least some implementations, the security module 110 is configured to manage the boot process for the processor 102, initialize security-related mechanisms for the processor 102, and monitor the processing system 100 for suspicious activity or events and implement an appropriate response. In some implementations, the security module 110 includes a microcontroller, a cryptographic coprocessor (CCP) to encrypt and decrypt data, local memory, and local registers to store, for example, cryptographic keys, and includes interfaces to interact with the memory 104, the I/O controller of the processor 102, and configuration registers of the processor 102. In some implementations, the security module 110 includes Environment Management Control hardware that performs environmental and security checks to ensure that the processor 102 operates according to specified security parameters.

In some implementations, the security module 110 manages a device binding process, wherein an I/O device 106 is bound to a VM 114, also referred to as a guest, executing in the confidential computing environment by undergoing a specified security registration process. For example, in some implementations, the VM 114 seeks to bind the I/O device 106 by sending a binding request to the security module 110. In response, the security module 110 initiates the specified security registration process, such as by requesting authentication information (e.g., a device certificate) from the I/O device 106 and verifying the authentication information (e.g., by comparing the authentication information or key information generated based on the authentication information, to one or more security keys). If the authentication information received from the I/O device 106 is verified, the security module 110 indicates to the VM 114 and other components of the processor 102, as described further herein, that the I/O device 106 is bound to the VM 114.

It will be appreciated that, in some implementations, an I/O device 106 can be bound to multiple VMs 114 by undergoing the specified security registration process for that VM 114. For example, in some implementations, each VM 114 employs a different virtual function (VF) to interact with a physical I/O device 106, thus allowing the I/O device 106 to be virtualized as a different virtual I/O device for each VM 114. In some implementations, the security module 110 binds an I/O device 106 to a VM 114 by binding the corresponding VF to the VM 114, thus allowing a single physical I/O device 106 to be bound to multiple VMs 114 (as long as the physical I/O device 106 undergoes the security registration process for each VM 114).

The security module 110, in at least some implementations, binds an I/O device 106 to a VM 114 by using a registration/binding process, such as a Trusted Execution Environment (TEE) Device Interface Security Protocol (TDISP) process. For example, in some implementations, the processing system 100 includes a communication fabric (not shown) that complies with a PCIe communication protocol. In particular, I/O devices 106 are configured to communicate with the processor 102 and the IOMMU 112, according to the PCIe communication protocol. In some implementations, the PCIe communication protocol establishes a TDISP security registration process for binding I/O devices to VMs, and the security module 110 uses the TDISP security registration process to bind I/O devices to executing VMs. In addition, the security module 110 assigns sets of memory addresses to respective executing VMs.

In some implementations, an I/O device 106 has its own translation lookaside buffer (TLB), sometimes referred to as an address translation cache (ATC) and uses an address translation service (ATS) to request address translation from the IOMMU 112. The I/O device 106 is assigned to the VM 114. In response to the I/O device 106 requesting ATS, the IOMMU 112 performs security checks, including checking that the I/O device 106 is bound to the VM 114, and that the ATS request targets a region of memory assigned to the VM 114. If either of these checks fails, the IOMMU 112 denies the ATS request. If both the checks are passed, the IOMMU 112 translates the address and returns the translated address to the I/O device 106, which caches the translated address at the ATC. Subsequently, the I/O device 106 issues a DMA request using the translated address. In response, the IOMMU 112 performs the security checks for the DMA request, using the mapping table.

As noted above, the processing system 100 is generally configured to implement a confidential computing environment and, in particular, to execute a plurality of VMs 114, and a hypervisor 116, also referred to as a host, to manage the execution of the plurality of VMs 114. Because the different VMs 114, and at least in some cases the hypervisor 116, are owned by different entities, the processing system 100 implements security features to protect the data of a given VM 114 from access by other software, such as by another VM 114 or by the hypervisor 116. For example, the processing system 100 implements data security for the VMs 114 by implementing a secure region of the memory 104 that stores encrypted data. In particular, the processor 102 is configured to encrypt specified data for each VM 114 according to a corresponding private cryptographic key and to store the encrypted data at the secure region. Because the data is encrypted, the data for one VM 114 is protected from unauthorized access by other VMs 114 and by the hypervisor 116. In at least some implementations, cryptographic keys for the VMs 114 are managed by the security module 110, and data encryption and decryption for the VMs 114 is executed by a dedicated hardware encryption/decryption module (not shown) at a memory controller (not shown) of the processor 102.

An I/O device 106, in at least some implementations, accesses memory 104 assigned to a VM 114 by generating direct memory access (DMA) requests to read data from the memory 104, write data to the memory 104, or a combination thereof. The IOMMU 112 is configured to handle the DMA requests issued by I/O devices 106. For example, to enhance processing efficiency, the IOMMU 112 is generally configured to perform address translation and memory protection on behalf of the processor 102—that is, to perform address translation and memory protection operations using dedicated hardware of the IOMMU 112. In particular, the IOMMU 112 includes dedicated hardware to perform memory address translation and memory protection for DMA operations, wherein I/O devices 106 generate DMA requests to read data from the memory 104, write data to the memory 104, or a combination thereof. In some implementations, each DMA request includes a descriptor indicating the virtual addresses of the data to be accessed—that is, the virtual address of the data to be read, the virtual address where data is to be written, or both. These virtual addresses indicate the region of the memory 104 that is targeted by the DMA request. The IOMMU 112 is generally configured to translate the virtual addresses indicated by a DMA request to physical addresses of the memory 104, and to interact with the memory 104 to carry out the one or more operations (read operations, write operations, or a combination thereof) indicated by the DMA request.

The processing system 100, in at least some implementations, maintains one or more data structures, such as device tables 120 (illustrated as device table 120-1 and device table 120-2) comprising device control information 122 (illustrated as device control information 122-1 and device control information 122-2) associated with I/O devices 106 and VMs 114. The processing system 100 uses the device table(s) 120 to, for example, enable a VM, disable a VM, securely manage access to a VM 114 by an I/O device 106 (which can be actual/physical devices or virtual devices), and the like.

In many confidential computing environments, the hypervisor typically programs a device table. Therefore, if a VM sends a request/instruction to program the device table, such as to program or enable/disable one or more functions of an I/O device, the hypervisor would intercept that request and program the device table, which introduces vulnerabilities into the confidential computing environment. For example, allowing the hypervisor to manage and program device control information or to control which device I/O functions are enabled or disabled for a particular VM can allow the hypervisor to determine VM behavior and potentially expose confidential data. Also, a malicious hypervisor can control functionality of I/O devices through their associated device control information to identify the behavior of a particular VM, such as how a VM attempts to use a particular I/O device, which devices are the target of particular VM requests, and the like. The malicious hypervisor can use this behavior to potentially identify confidential information associated with a VM. In addition, enabling or disabling particular device controls can allow attacks on a VM via an I/O device.

To address these and other potential security issues, the processing system 100 maintains a first device table 120-1, also referred to herein as hypervisor accessible tables (HDTs) 120-1, that is accessible to the hypervisor 116 and one or more device tables 120-2, also referred to herein as secure device tables (SDTs), that are accessible to the security module 110 and the IOMMU 112 but that are not accessible to the hypervisor 116. The HDT 120-1, in at least some implementations, is maintained by the hypervisor 116 in a portion of the memory 104 accessible to the hypervisor 116. However, the SDT 120-2 is maintained by the security processor 110 in a secure region 118 of the memory 104 that is accessible to the security processor 110 and the IOMMU 112 but not the hypervisor 116.

In at least some implementations, the HDT 120-1 includes device control information 122 (illustrated as device control information 122-1) that does not cause a security risk to the VMs 114 if accessed by the hypervisor 116. For example, the HDT 120-1 includes information that allows the hypervisor 116 to enable or disable a VM 114, host paging table information, interrupt remapping table information, and the like. The SDT 120-2, in at least some implementations, includes secure (confidential) device control information 122-2, such as a device identifier for one or more I/O devices 106, a VM identifier (VMID) for the VM 114 operating in communication with, responsible for, or otherwise associated with the I/O device 106, an address space identifier (ASID), device (or device interface) VM binding information, the memory encryption key index for accessing the VM memory, PCIe stream identifier information, a PCIe root port identifier, a secure ATS mode indicator, a combination thereof, or the like.

A VMID includes a unique identifier for a respective VM 114. As an example, for each VM executing at processor 102 or expected to be executed at processor 102, the security module 110 assigns a respective VMID that includes a unique identifier to the VMs 114. As the VMID includes a unique identifier for a VM 114, a field in the SDT 120-2 including the VMID indicates the VM corresponding to the related entry of SDT 120-2. An ASID identifies the memory address spaces allocated to the VM 114 associated with the corresponding entry of the SDT 120-2. For example the security processor 110 defines one or more memory address spaces based on, for example, the memory 104, registers and other storage locations of I/O devices 106, or a combination thereof and assigns a respective ASID to each memory address space. Such ASIDs, for example, include a unique identifier for each memory address space. During a provisioning process, the security processor 110 then allocates one or more memory address spaces to respective VMs 114. The device (or device interface) VM binding information indicates whether or not the I/O device 106 associated with the SDT entry is securely bound to the VM 114 identified by the VMID of the SDT entry. PCIe stream identifier information indicates the set of expected stream IDs to be used by an I/O device 106 associated with the SDT entry. Each stream identifier corresponds to an encrypted and integrity protected channel for secure communication over a PCIe link. A PCIe root identifier indicates the root port to which the I/O device 106 associated with SDT entry is connected. The secure ATS mode indicator provides an indication of the mode used to handle ATS address translation requests received from the I/O device 106 associated with the SDT entry. For example, the ATS mode indicator indicates whether to return system physical addresses or guest physical addresses.

In at least some implementations, the security module 110 generates and maintains the SDTs 120-2. For example, when the security module 110 assigns a VMID or an ASID to a VM 114, the security module 110 stores the VMID or ASID in the entry of the SDT 120-2 associated with the VM 114. Also, when the security processor 110 binds an I/O device 106 (or device interface) to a VM, the security processor stores the binding information in the corresponding entry of the SDT 120-2. As described above, the SDT(s) 120-2 and the secure/confidential device control information 122-2 stored therein are not accessible to the hypervisor 116. However, the SDT(s) 120-2 and the secure device control information 122-2 are indirectly accessible to a VM 114 through the security processor 110.

In at least some implementations, an I/O device 106 submits a device request 124 to access a VM 114. Examples of a device request 124 include a DMA request or an address translation request. The IOMMU 112 receives the device request 124 and determines (e.g., based on a descriptor included with the device request 124) the VM 114 that is targeted by the device request 124. For example, in some implementations, each device request 124 includes a VM identifier (e.g., a VMID) indicating the VM 114 targeted by the device request 124. In some implementations, the device request 124 includes a requestor identifier, indicating the I/O device 106 that issued the device request 124. The IOMMU 112 determines, based on the secure device control information 122-2 of the SDT 120-2, if the requesting I/O device 106 is bound to the targeted VM 114. If not, the IOMMU 112 prevents execution of the device request 124. For example, in some implementations, if the device request 124 is a DMA request (or address translation request), the IOMMU 112 prevents execution of the DMA request by not initiating an address translation process for the DMA request, so that the virtual addresses indicated by the DMA request are not translated to physical addresses. This prevents the DMA request from being properly executed, thereby protecting confidential information associated with the VM 114.

In response to identifying that the requesting I/O device 106 (that is the I/O device 106 that issued the device request 124) is bound to the targeted VM 114, the IOMMU 112 determines whether the device request 124 targets a portion of the memory 104 that is within the region of memory assigned to the targeted VM 114, as indicated by the secure device control information 122-2 (e.g., ASID) of the SDT 120-2. To illustrate, if the device request 124 is a DMA request (or address translation request), the DMA request indicates the virtual addresses that are to be read, that are to be written, or a combination thereof. In at least some implementations, the IOMMU 112 translates the virtual addresses indicated by the device request 124 to physical addresses to determine ownership. The IOMMU 112 compares the physical addresses to the addresses identified by the ASID stored in the secure device control information 122-2 associated with the targeted VM 114. The IOMMU 112 determines if all of the addresses associated with the device request 124 are within the region of memory assigned to the corresponding VM 114, as indicated by the secure device control information 122-2. If any of the addresses associated with the device request 124 fall outside of the assigned memory region of the targeted VM 114, the IOMMU 112 prevents execution of the DMA request, as described above. If the addresses indicated by the DMA request are within the assigned memory region of the targeted VM 114, the IOMMU 112 executes the DMA request. The IOMMU 112 thus ensures that device requests 124 are only satisfied if 1) the requesting I/O device 106 is bound to the targeted VM 114; and 2) the device request 124 targets a portion of the memory 104 that is assigned to the targeted VM 114. The IOMMU 112, using the SDT 120-2, thus prevents a malicious entity from accessing confidential VM information via a device request.

It will be appreciated that, in some implementations, the operations of the IOMMU 112 occur in a different order than described in the above example. For example, in some implementations the IOMMU 112 first checks whether the device request 124 targets a portion of the memory 104 that is assigned to the targeted VM 114. If so the IOMMU 112 then checks whether the requesting I/O device 106 is bound to the VM 114. In other implementations, the IOMMU 112 checks both conditions (whether the requesting I/O device 106 is bound to the targeted VM 114 and whether the device request 124 targets a portion of the memory 104 assigned to the VM 114) concurrently or in parallel.

Figure 2:
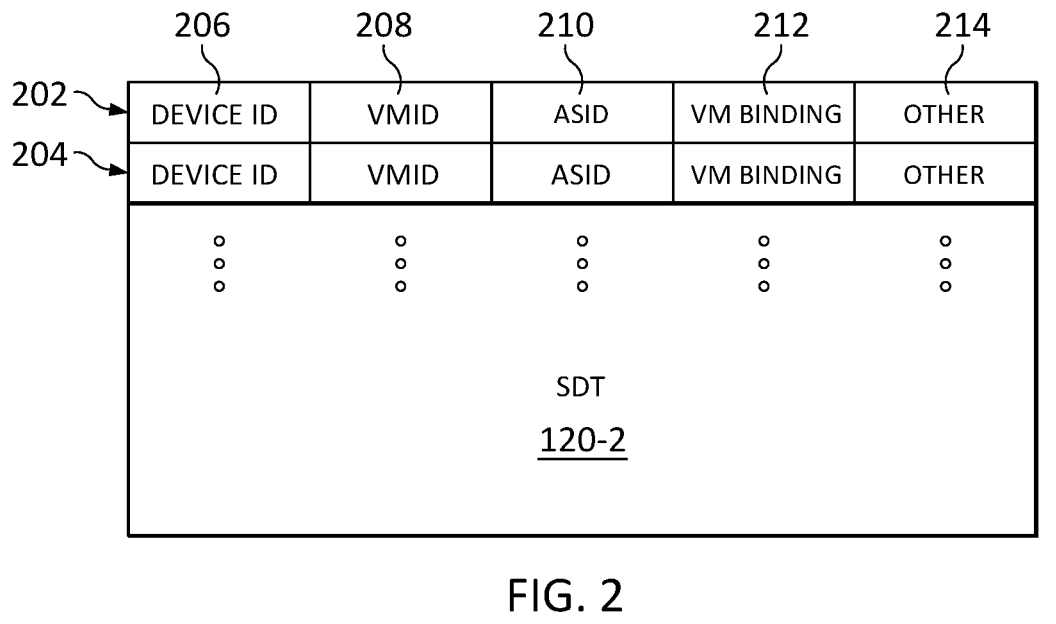

FIG. 2 illustrates an example of the SDT 120-2 in accordance with some implementations. In the depicted example, the SDT 120-2 includes a plurality of entries (e.g., entry 202 and entry 204), wherein each entry is assigned to a different I/O device 106 (or VM 114). Each entry of the SDT 120-2 includes secure device control information 122-2 stored in one or more fields, including a device identifier field 206, a VM identifier field 208, an assigned memory field 210, and a VM binding indicator field 212. In at least some implementations, each entry of the SDT 120-2 also includes one or more other fields 214. The device identifier field 206 of an entry stores a value, or set of values, indicating a device identifier (device ID) for the corresponding I/O device 106. In some implementations, in response to an I/O device 106 (or device interface) being assigned to a VM 114, the security module 110 stores the device ID of the assigned I/O device 106 in a corresponding entry 202 of the SDT 120-2. The VM identifier field 208 stores a virtual machine identifier (VMID) assigned by the security module 110 to the VM 114 assigned to the I/O device 106 associated with the entry 202. The assigned memory field 210 stores, for example, the ASID assigned by the security module 110 to the VM 114 identified in the VM identifier field 208. The VM binding indicator field 212 stores an indication whether or not the I/O device 106 associated with the entry 202 has been securely bound to the VM 114 identified in the VM identifier field 208. For example, in response to the I/O device 106 successfully completing a specified security process for binding, the security module 110 stores an indicator in the VM binding indicator field 212 to indicate that the I/O device 106 has been bound to the VM 114 identified in the VM identifier field 208. The one or more other fields 214 include other device control information 122-2, such as the memory encryption key index for accessing the VM memory, PCIe stream identifier information, a PCIe root port identifier, a secure ATS mode indicator, a combination thereof, or the like.

In at least some implementations, when the IOMMU 112 determines that a device request 124 has been received from an I/O device 106, the IOMMU 112 uses the device ID field 206 to identify the entry 202 of the SDT 120-2 corresponding to the requesting I/O device 106. The IOMMU 112 compares the VM identifier included in the device request 124 to the VMID included in the VM identifier field 208 to determine if the requesting I/O device 106 is requesting access to the VM 114. The IOMMU 112 also compares the address information included in the device request 124 to the ASID included in the assigned memory field 210. The IOMMU 112 further accesses the VM binding indicator field 212 to determine if the requesting I/O device 106 is securely bound to the targeted VM 114. If the IOMMU 112 determines that the requesting I/O device 106 is attempting to access a VM 114 that the requesting device 106 is not assigned to or securely bound to, or is attempting to access memory 104 that is not assigned to the targeted VM 114, the IOMMU 112 does not execute the device request 124. Otherwise, the IOMMU 112 executes the device request 124.

Figure 3:
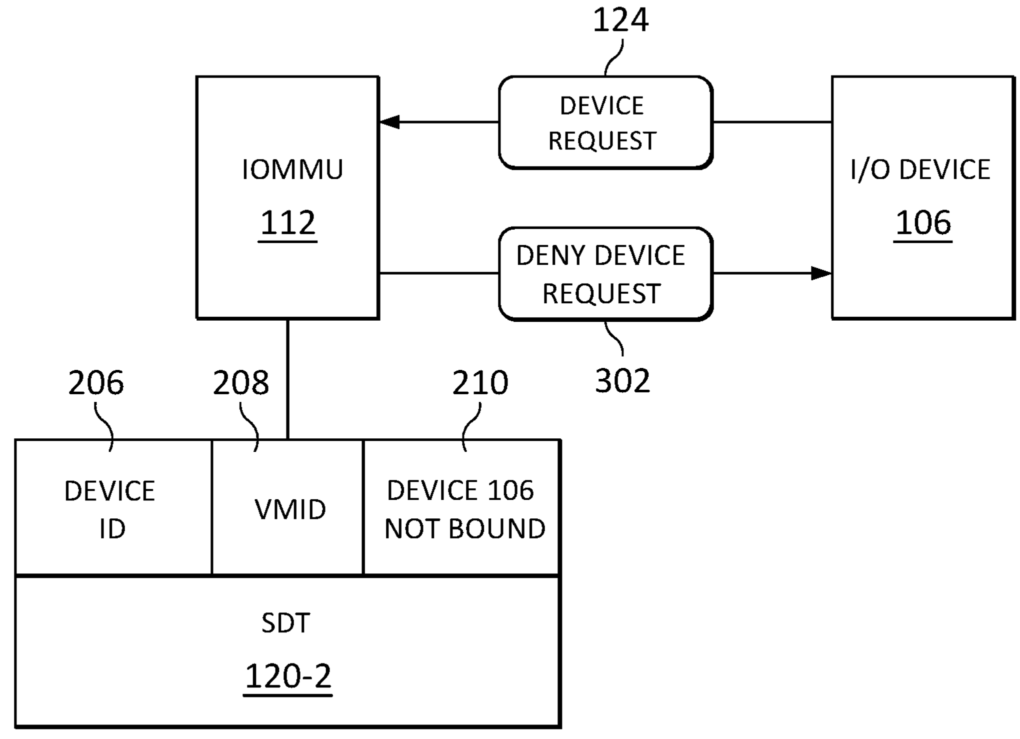
FIG. 3 is a block diagram illustrating an example of an input/output memory management unit (IOMMU) of the processing system of FIG. 1 securely managing a device request from an I/O device using the secure device table of FIG. 2 in accordance with some implementations.

FIG. 3 illustrates an example of the IOMMU 112 using the SDT 120-2 to prevent execution of the device request 124 in accordance with some implementations. In the illustrated example, the IOMMU 112 receives the device request 124 from the I/O device 106. The device request 124 includes a descriptor, as prepared by the I/O device 106, indicating that the device request 124 is associated with the VM 114 (e.g., by including the VMID for the VM 114 in the descriptor). That is, the I/O device 106 indicates, via a field of the device request 124, that the request to perform address translation, read data, write data, or transfer (read and write) data, is on behalf of the VM 114. The I/O device 106 also provides its own device ID in the device request 124, to indicate that the request was generated by the I/O device 106.

In response to receiving the device request 124, the IOMMU 112 accesses the SDT 120-2, and in particular the entry of the SDT 120-2 that corresponds to the requesting I/O device 106 (or targeted VM 114). For example, in some implementations, the IOMMU 112 employs the device identifier (or VMID) indicated by the device request 124 to locate the entry of the SDT 120-2 with the corresponding device identifier (or VMID) in the device ID field 206 (or VM identifier field 208). The IOMMU 112 then compares the VMID (or device identifier) in the device request 124 with the VMID (or device identifiers) stored at the VM identifier field 208 (or device ID field 206) of the entry of the SDT 120-2. If the entry includes a VM identifier that matches the VM identifier included in the device request, the IOMMU 112 determines that the requesting I/O device 106 is assigned to the targeted VM 114. Otherwise, the IOMMU 112 determines that the requesting I/O device 106 is not assigned to the targeted VM 114 and prevents execution of the device request 124, as described above with respect to FIG. 1.

The IOMMU 112 also obtains the value stored in the VM binding field 212 to determine if the requesting I/O device 106 is securely bound to the VM 114 associated with the device request 124. In another example, the VM binding field 212 includes VM identifiers indicating the VM 114 to which I/O device 106 associated with the entry of the SDT 120-2 is securely bound, or includes device identifiers indicating the I/O devices 106 securely bound to the VM 114 associated with the SDT entry 120-2. In the example of FIG. 3, it is assumed that the information stored in the SDT 120-2 indicates that the requesting I/O device 106 is not securely bound to the targeted VM 114 by the security module 110. In response to determining that the requesting I/O device 106 is not securely bound to the targeted VM 114, the IOMMU 112 prevents execution of the device request 124. For example, in some implementations, the IOMMU 112 prevents execution of the device request 124 by preventing use of an address mapping field included in the SDT 120-2 or another mapping table to translate the virtual addresses of the device request 124 to physical addresses. In addition, the IOMMU 112 provides a message 302 to the requesting I/O device 106 indicating that the device request 124 is denied. In some implementations, the IOMMU 112 also provides the message 302 (or a similar message) to the targeted VM 114. In some implementations, the IOMMU 112 also notifies the security module 110 that the device request 124 has been denied, and that there has been a potential attempt at a security breach by the I/O device 106. This allows the security module 110 to take remedial action, such as notifying a system administrator of the potential security breach.

Figure 4:
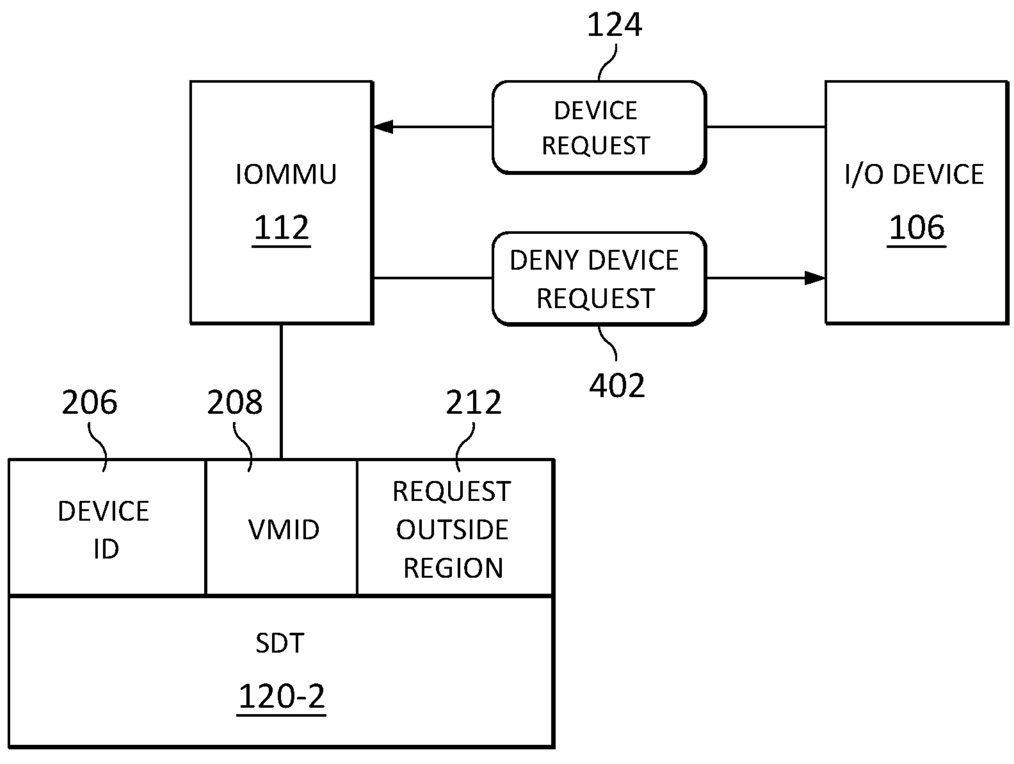
FIG. 4 is a block diagram illustrating another example of the IOMMU securely managing a device request from an I/O device using the secure device table of FIG. 2 in accordance with some implementations.

FIG. 4 illustrates another example of the IOMMU 112 using the mapping SDT 120-2 to prevent execution of the device request 124 in accordance with some implementations. In the illustrated example, similar to FIG. 3, the IOMMU 112 receives the device request 124 from the I/O device 106. The device request 124 includes a descriptor, as prepared by the I/O device 106, indicating the portion of the memory 104 that is targeted by the device request 124. That is, the requesting I/O device 106 indicates, via a field of the device request 124, the memory addresses targeted by the request to read data, write data, or transfer (read and write) data, is on behalf of the targeted VM 114.

In response to receiving the device request 124, the IOMMU 112 accesses the SDT 120-2, and in particular the entry of the mapping SDT 120-2 that corresponds to the requesting I/O device 106 (or targeted VM 114). The IOMMU 112 then compares the memory portion indicated by the device request 124 with the memory portion indicated by the assigned memory field 210 of the entry of the SDT 120-2. In the example of FIG. 4, it is assumed that the memory portion indicated by the device request 124 falls at least partially outside the memory portion identified by the assigned memory field 210. That is, the device request 124 at least partially targets a portion of the memory 104 that has not been assigned to the targeted VM 114. In response, the IOMMU 112 prevents execution of the device request 124 and notifies the security module 110 that the device request 124 has been denied by sending a message 402.

In at least some implementations, the information represented by the SDT 120-2 is stored in multiple different tables, that are differently indexed. For example, in some implementations, a first table (referred to as a source validation table) stores the device identifier field 206 (or VM identifier field 208) and corresponding bound device field 212 for each I/O device 106 (or VM 114), and a second table (referred to as a memory ownership table) stores the assigned memory field 210 and corresponding VM identifier field 208. The IOMMU 112 receives a device request from an I/O device 106, wherein the device request includes a device identifier for the I/O device 106 and a virtual address targeted by the device request. The IOMMU 112 accesses the source validation table to determine if the I/O device 106 is bound to the targeted VM 114. If not, the IOMMU 112 does not execute the request.

If the I/O device 106 is bound to the targeted VM 114, the IOMMU 112 translates the virtual address to a physical address using a set of page tables. The IOMMU 112 uses the physical address to index the memory ownership table and compares the resulting VM identifier from the memory ownership table to the VM 114 indicated by the source validation table. If the VM identifiers do not match, the IOMMU 112 does not execute the device request. If the VM identifiers match, the IOMMU 112 executes the device request.

Figure 5:
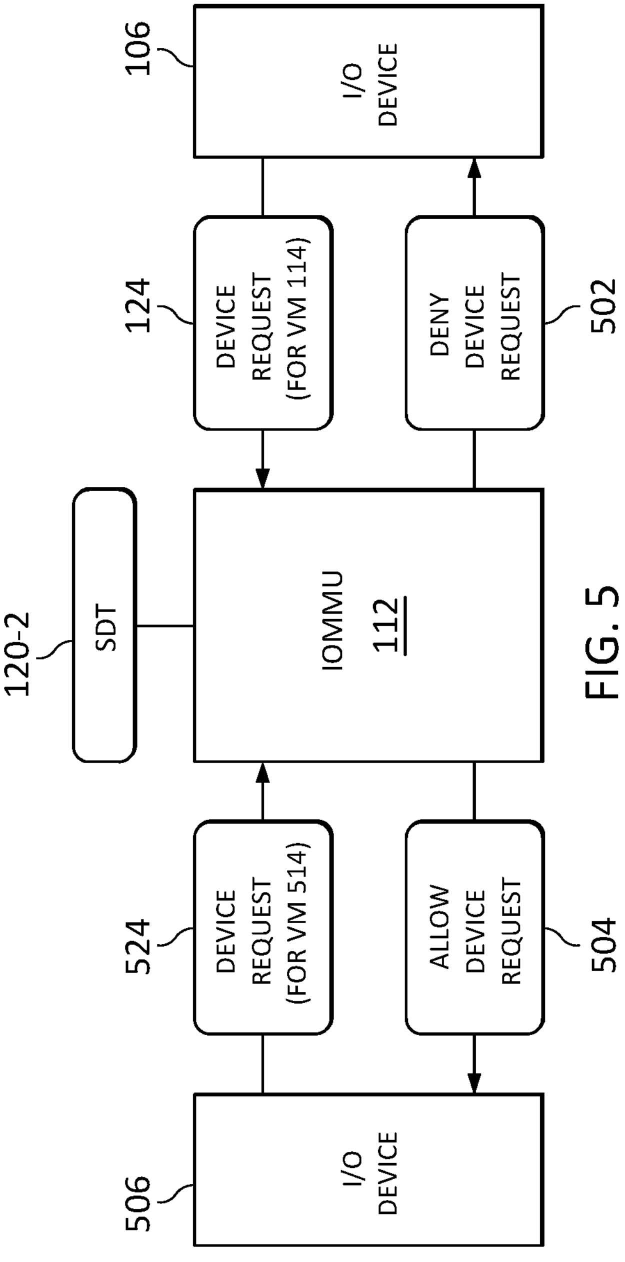
FIG. 5 is a block diagram illustrating an example of the IOMMU securely managing device requests from multiple I/O devices using the secure device table of FIG. 2 in accordance with some implementations.

As noted above, the SDT 120-2 stores individual entries for each assigned I/O device, each VM 114 that is executing at the processor 102, or a combination thereof. This allows the IOMMU 112 to allow or deny device requests for different VMs 114 on an individual basis, independent of the device request for other VMs 114. An example is illustrated at FIG. 5 in accordance with some implementations. For the example of FIG. 5, it is assumed that the processor 102 is executing two different VMs: the VM 114 and a VM 514. The IOMMU 112 receives the device request 124 from the I/O device 106, indicating a request to access memory on behalf of the VM 114. It is further assumed that the SDT 120-2 indicates that the requesting I/O device 106 is not bound to the VM 114, that the device request 124 targets a portion of the memory 104 that has not been assigned to the VM 114, or both. Accordingly, the IOMMU 112 prevents execution of the device request 124 and indicates (via the message 502) that the device request 124 has been denied.

With respect to the device request 524, it is assumed that the SDT 120-2 indicates that the I/O device 506 is bound to the VM 514. It is further assumed that the SDT 120-2 indicates that the device request 524 targets a portion of the memory 104 that has been assigned to the VM 514. Accordingly, the IOMMU 112 determines that the device request 524 is allowed (as indicated by a message 504), and therefore executes the device request 524. Thus, in the example of FIG. 5, the IOMMU 112 selectively allows some device requests and denies others, thus preventing a malicious actor from halting or slowing execution of multiple VMs at the processing system 100 by issuing an improper device request.

Figure 6:
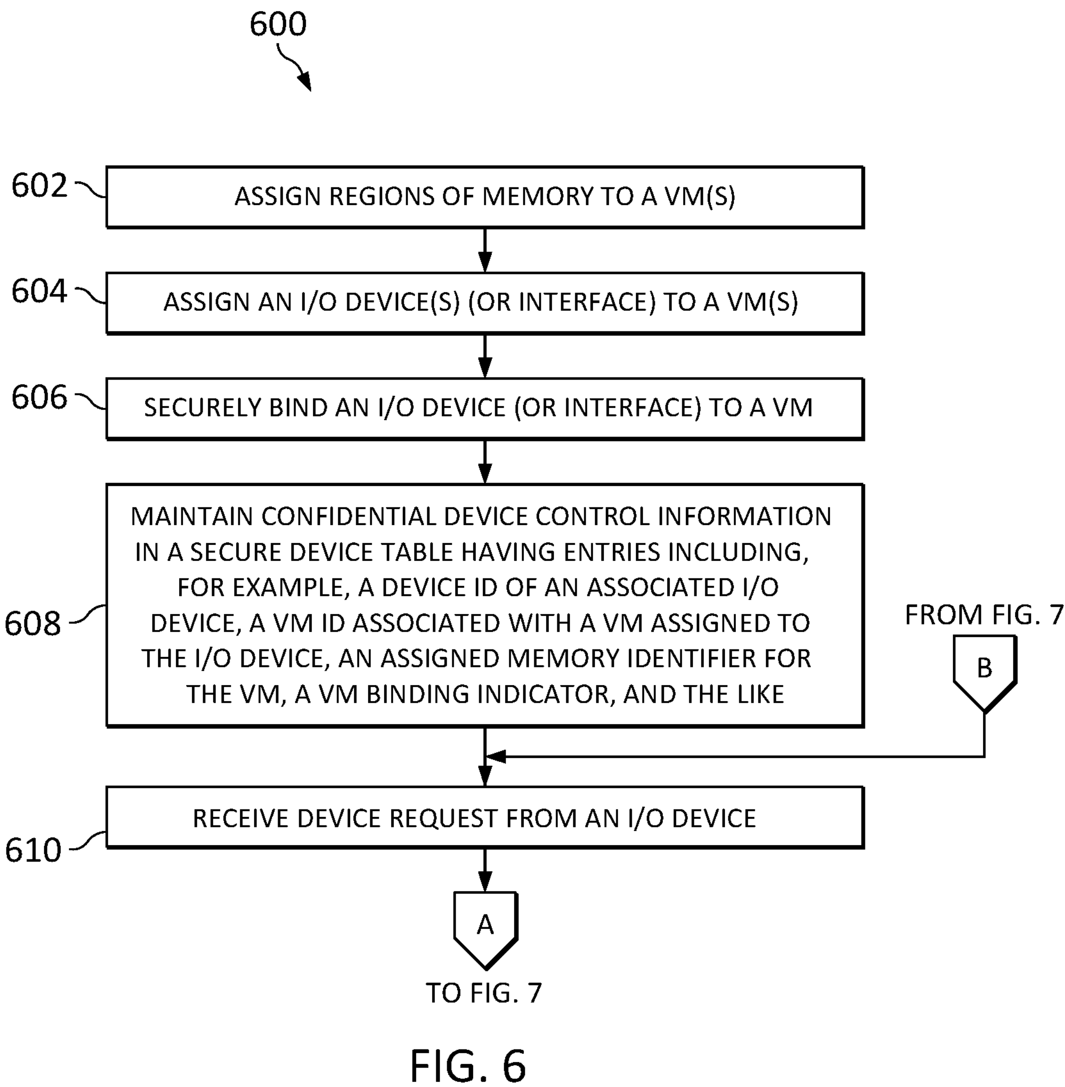
FIG. 6 and FIG. 7 together are diagrams illustrating a flow diagram of a method of securely managing device control information using a secure device table in accordance with some implementations.
Figure 7:
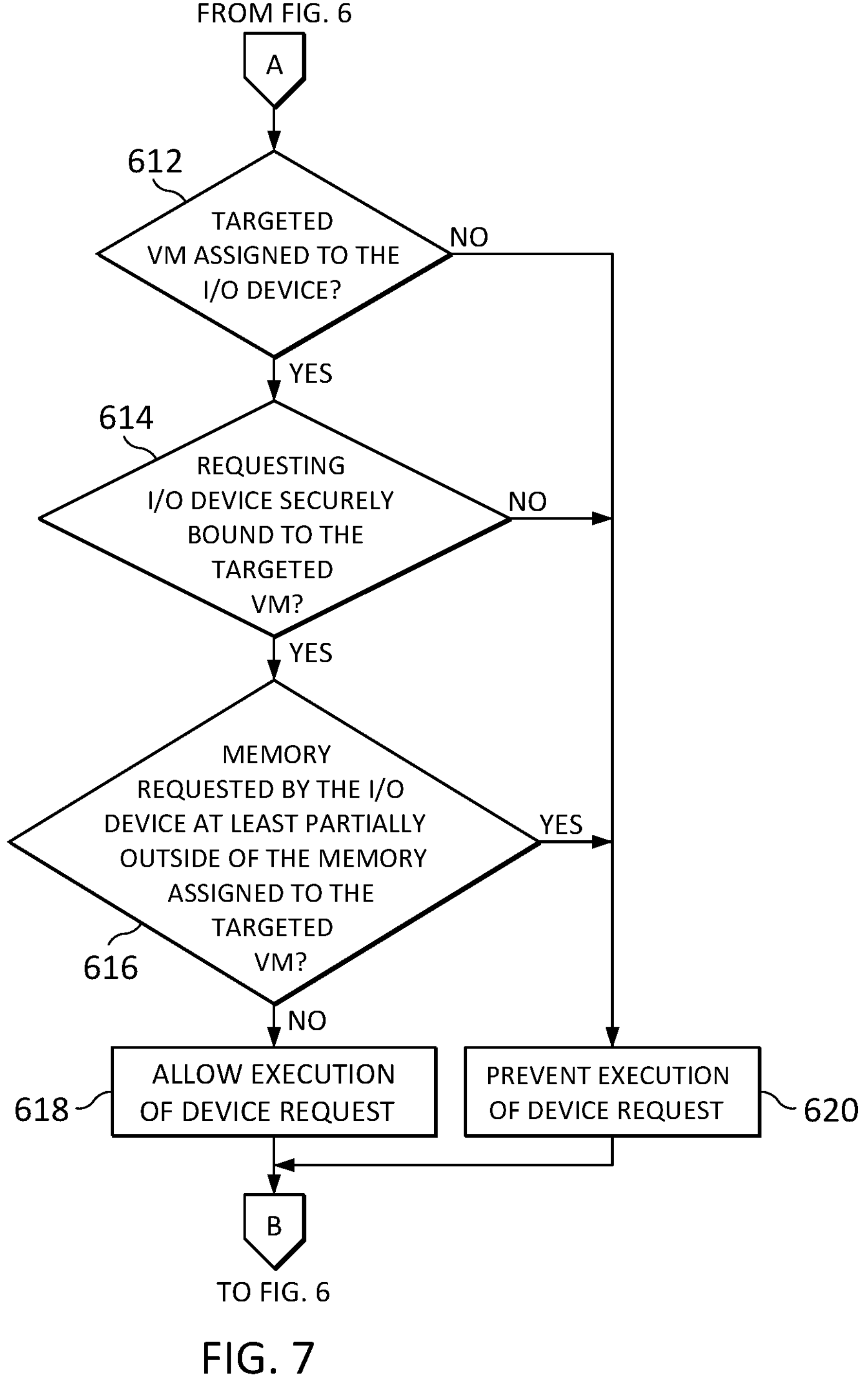

FIG. 6 and FIG. 7 together illustrate a flow diagram of a method 600 of managing and implementing secure device control information in accordance with some implementations. For purposes of description, the method 600 is described with respect to an example implementation at the processing system 100 of FIG. 1, but it will be appreciated that, in other implementations, the method 600 is implemented at processing systems having different configurations. Also, the method 600 is not limited to the sequence of operations shown in FIG. 6 and FIG. 7, as at least some of the operations can be performed in parallel or in a different sequence.

At block 602, the security module 110 assigns regions (portions) of memory 104 to one or more VMs 114. At block 604, the security processor 110 assigns one or more I/O devices 106 (or device interfaces) to one or more VM(s) 114. At block 606, the security processor 110 securely binds the one or more I/O devices (or device interfaces) to a specified VM 114. At block 608, the security processor 110 maintains confidential device control information 122-2 in an SDT 120-2. For example, the security processor 110 maintains an entry for a specified I/O device 106 that includes a device identifier of the I/O device 106 in a device identifier field 206, a VM identifier of a VM 114 assigned to the I/O device 106 in a VM identifier field 208, an identifier for the memory assigned to the VM 114 in an assigned memory field 210, an indication of whether the I/O device 106 is securely bound to the identified VM 114 in a VM binding indicator field 212, and the like.

At block 610, the IOMMU 112 receives a device request 124 (e.g., a DMA request or an address translation request) from an I/O device 106. The device request 124 includes, for example, an identifier of the requesting I/O device 106, an identifier of the VM 114 associated with the device request 124, address information indicating the portion of the memory 104 targeted by the request device 124, and the like. At block 612, the IOMMU 112 determines if the requesting I/O device 106 is assigned to the VM 114 targeted by the device request 124. If not, the method flow moves to block 620 and the IOMMU 112 prevents execution of the device request 124. The method flow then returns to block 610.

If, at block 612, the IOMMU 112 determines that the requesting I/O device 106 is assigned to the targeted VM 114, the method flows to block 614 and the IOMMU 112 determines whether the requesting I/O device 106 is securely bound to the targeted VM 114. In at least some implementations, the IOMMU 112 determines whether the requesting I/O device 106 is securely bound to the targeted VM 114 by a specified security registration process, such as TDISP. If the requesting I/O device 106 is not bound to the targeted VM 114 (or is not bound by the specified security registration process), the method flow moves to block 620 and the IOMMU 112 prevents execution of the device request 124. The method flow then returns to block 610. If, at block 614, the IOMMU 12 determines that the requesting I/O device 106 is securely bound to the targeted VM 114, the method flow moves to block 616 and the IOMMU 112 determines whether the device request 124 targets a portion of the memory 104 that is assigned to the targeted VM 114. If not, the method flow moves to block 620 and the IOMMU 112 prevents execution of the device request 124. If the device request 124 does target a portion of the memory 104 that is assigned to the targeted VM 114, the method flow moves to block 618 and the IOMMU 112 executes the device request 124. The method flow then returns to block 610.

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations However, one of ordinary skill in the art appreciates that various modifications and changes can be made without departing from the scope of the present disclosure as set forth in the claims below Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:

maintaining device control information in a secure data structure, wherein a hypervisor is prevented from accessing the secure data structure and the device control information controlling access of an input/output (I/O) device to a virtual machine (VM); and processing at least one device request targeting a VM from an I/O device based on the secure data structure.

2. The method of claim 1, further comprising:

maintaining different device control information in a data structure that is accessible to the hypervisor.

3. The method of claim 1, wherein the device control information includes one or more of:

a device identifier identifying an I/O device;

a virtual machine identifier identifying a VM assigned to the identified I/O device;

an identifier identifying memory assigned to the identified VM;

a VM binding indicator indicating whether the identified I/O device is bound to the identified VM;

one or more Peripheral Component Interconnect Express (PCIe) stream identifiers;

PCIe root port information;

one or more PCIe feature settings; or one or more Address Translation Service (ATS) mode indicators.

4. The method of claim 1, wherein processing the at least one device request based on the secure data structure comprises:

identifying, at an input/output memory management unit (IOMMU) and based on the device control information, whether the I/O device is bound to the targeted VM;

responsive to identifying that the I/O device is not bound to the targeted VM, preventing, at the IOMMU, execution of the device request; and responsive to identifying that the I/O device is bound to the targeted VM, executing, at the IOMMU, the device request.

5. The method of claim 4, wherein identifying whether the I/O device is bound to the targeted VM further comprises identifying whether the I/O device is bound to the targeted VM by a specified security registration process.

6. The method of claim 5, wherein executing the device request is in response to identifying that the I/O device is bound to the targeted VM by the specified security registration process.

7. The method of claim 5, wherein preventing execution of the device request is in response to identifying that the I/O device is not bound to the VM by the specified security registration process.

8. The method of claim 5, wherein the specified security registration process comprises a Trusted Execution Environment (TEE) Device Interface Security Protocol (TDISP) registration process.

9. The method of claim 4, wherein identifying whether the I/O device is bound to the targeted VM comprises identifying if device control information stored in an entry of the secure data structure associated with the I/O device comprises a VM binding indicator indicating that the I/O device is bound to the targeted VM.

10. The method of claim 1, wherein processing the at least one device request based on the secure data structure comprises:

identifying, at an input/output memory management unit (IOMMU) and based on the device control information, whether the I/O device is targeting memory that is assigned to the targeted VM;

responsive to identifying that the targeted memory is not assigned to the targeted VM, preventing, at the IOMMU, execution of the device request; and responsive to identifying that targeted memory is assigned to the targeted VM, executing, at the IOMMU, the device request.

11. The method of claim 10, wherein identifying whether the I/O device is targeting memory that is assigned to the targeted VM comprises determining if an entry of the secure data structure associated with the I/O device includes an assigned memory identifier for the targeted VM that corresponds to the targeted memory.

12. A method comprising:

responsive to assigning an input/output (I/O) device to a virtual machine (VM), updating an entry in a secure data structure maintaining device control information for the I/O device to include an indication that the I/O device has been assigned to the VM, wherein the secure data structure is not accessible to a hypervisor; and responsive to receiving a device request targeting a VM from the I/O device, processing the device request based on the secure data structure.

13. The method of claim 12, wherein processing the device request based on the secure data structure comprises:

identifying, at an input/output memory management unit (IOMMU) and based on the device control information maintained in the entry, whether the I/O device is bound to the targeted VM;

responsive to identifying that the I/O device is not bound to the targeted VM, preventing, at the IOMMU, execution of the device request; and responsive to identifying that the I/O device is bound to the targeted VM, executing, at the IOMMU, the device request.

14. The method of claim 12, wherein processing the device request based on the secure data structure comprises:

identifying, at an input/output memory management unit (IOMMU) and based on the device control information maintained in the entry, whether the I/O device is targeting memory that is assigned to the targeted VM;

responsive to identifying that the targeted memory is not assigned to the targeted VM, preventing, at the IOMMU, execution of the device request; and responsive to identifying that targeted memory is assigned to the targeted VM, executing, at the IOMMU, the device request.

15. A processor comprising:

a security processor configured to maintain device control information in a secure data structure, wherein a hypervisor is prevented from accessing the secure data structure, the device control information controlling access of an input/output (I/O) device to a virtual machine (VM); and an input-output memory management unit (IOMMU) configured to:

process at least one device request targeting a VIM from an I/O device based on the secure data structure.

16. The processor of claim 15, wherein the IOMMU is configured to process the at least one device request based on the secure data structure by:

identifying, based on the device control information, whether the I/O device is bound to the targeted VM;

responsive to identifying that the I/O device is not bound to the targeted VM, preventing execution of the device request; and responsive to identifying that the I/O device is bound to the targeted VM, executing the device request.

17. The processor of claim 16, wherein the IOMMU is configured to identify whether the I/O device is bound to the targeted VM by identifying whether the I/O device is bound to the targeted VM by a specified security registration process.

18. The processor of claim 16, wherein the IOMMU is configured to identify whether the I/O device is bound to the targeted VM by identifying if device control information stored in an entry of the secure data structure associated with the I/O device comprises a VM binding indicator indicating that the I/O device is bound to the targeted VM.

19. The processor of claim 15, wherein the IOMMU is configured to process the at least one device request based on the secure data structure by:

identifying, based on the device control information, whether the I/O device is targeting memory that is assigned to the targeted VM;

responsive to identifying that the targeted memory is not assigned to the targeted VM, preventing execution of the device request; and responsive to identifying that targeted memory is assigned to the targeted VM, executing the device request.

20. The processor of claim 19, wherein the IOMMU is configured to identify whether the I/O device is targeting memory that is assigned to the targeted VM by determining if an entry of the secure data structure associated with the I/O device includes an assigned memory identifier for the targeted VM that corresponds to the targeted memory.

* * * * *